(12) United States Patent
Hayashi et al.

(10) Patent No.: US 6,363,039 B2
(45) Date of Patent: *Mar. 26, 2002

(54) DISK TILTING COMPENSATION WITH AN OFFSET SIGNAL TO CONTROL THE LOCATION OF A LIGHT BEAM

(75) Inventors: Hideki Hayashi, Nara; Yasuo Fujikawa, Ehime; Shin-ichi Kadowaki, Sanda; Ryusuke Horibe, Hirakata, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/427,825
(22) Filed: Oct. 27, 1999
(30) Foreign Application Priority Data Oct. 27, 1998 (JP) .............................. 10-304874

(51) Int. Cl.⁷ .................................... G11B 7/00
(52) U.S. Cl. .............................. 369/44.32; 369/44.28; 369/53.14
(58) Field of Search ................. 369/112, 54, 44.23, 369/44.32, 58, 44.27, 124.01, 44.13, 275.4, 100, 44.28, 44.29, 44.37, 44.41, 53.2, 112.17, 275.3, 53.14

(56) References Cited

U.S. PATENT DOCUMENTS

| | | | | |
|---|---|---|---|---|
| 4,866,688 A | * | 9/1989 | Ohtake et al. | 369/44.13 |
| 5,084,860 A | * | 1/1992 | Maeda et al. | 369/275.3 |
| 5,206,848 A | * | 4/1993 | Kusano et al. | 369/44.41 |
| 5,442,615 A | * | 8/1995 | Ohsato et al. | 369/112 |
| 5,699,340 A | * | 12/1997 | Lee et al. | 369/112 |
| 5,703,855 A | * | 12/1997 | Kirino et al. | 369/54 |
| 5,886,964 A | * | 3/1999 | Fujita | 369/44.37 |
| 5,970,035 A | * | 10/1999 | Ohmori et al. | 369/54 |
| 6,222,803 B1 | * | 4/2001 | Uemura et al. | 369/44.29 |

FOREIGN PATENT DOCUMENTS

JP 8-77583 3/1996

* cited by examiner

Primary Examiner—David Hudspeth
Assistant Examiner—Kim-Kwok Chu
(74) Attorney, Agent, or Firm—Ratner & Prestia

(57) ABSTRACT

An optical information recording and playback apparatus for recording and playing back an optical information recording medium having a transparent protective layer comprises a tilt detection device and an off-track adding device, and includes means for determining an optimum direction in which the center of a light spot is to be displaced from the centerline of an information track on the optical information recording medium to compensate for the tilting of the optical information recording medium relative to the light beam, means for setting the amount of displacement as fixed values, and means for splitting the optical information recording medium into a number of areas and for activating a tilt detection function each time switching is made from one area to another during recording or playback. In this way, by scanning the light spot on the optical information recording medium with the center of the light spot displaced from the centerline of the information track on the optical information recording medium, the degradation of recording/playback signal quality due to the tilting of the recording surface of the optical information recording medium can be reduced.

23 Claims, 9 Drawing Sheets

Fig. 4(a)

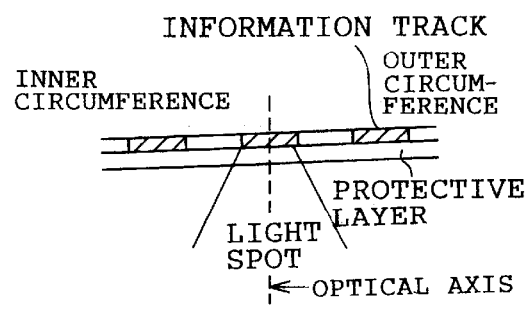

401 { INTENSITY DISTRIBUTION OF SPOT IN THE ABSENCE OF R TILT

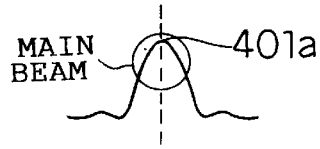

402 { INTENSITY DISTRIBUTION OF SPOT IN THE PRESENCE OF R TILT

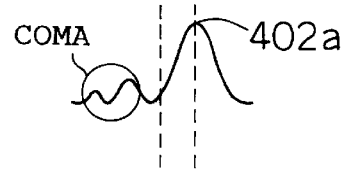

403 { DIRECTION IN WHICH LIGHT SPOT IS DISPLACED TO REDUCE JITTER

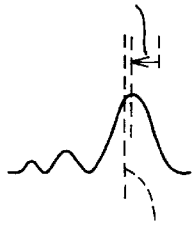

THEORETICAL CENTER OBTAINED FROM PHASE DIFFERENCE TE SIGNAL

Fig. 4(b)

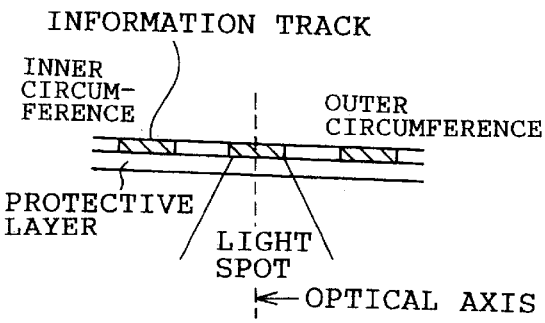

INTENSITY DISTRIBUTION OF SPOT IN THE ABSENCE OF R TILT

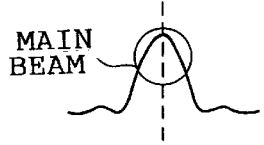

INTENSITY DISTRIBUTION OF SPOT IN THE PRESENCE OF R TILT

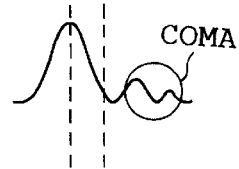

DIRECTION IN WHICH LIGHT SPOT IS DISPLACED TO REDUCE JITTER

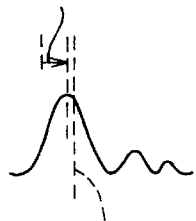 } 404

THEORETICAL CENTER OBTAINED FROM PHASE DIFFERENCE TE SIGNAL

WHEN RECORDING MEDIUM IS TILTED
TOWARD OUTER CIRCUMFERENCE
RELATIVE TO OBJECTIVE LENS

WHEN RECORDING MEDIUM IS TILTED
TOWARD INNER CIRCUMFERENCE
RELATIVE TO OBJECTIVE LENS

DISK TILTING COMPENSATION WITH AN OFFSET SIGNAL TO CONTROL THE LOCATION OF A LIGHT BEAM

BACKGROUND OF THE INVENTION

1. Field of the Invention

The present invention relates to an optical information recording and playback apparatus which performs recording and playback using a light beam on an optical information recording medium having a transparent protective layer.

2. Description of the Related Art

Heretofore, it is known to provide an optical information recording and playback apparatus which performs recording and playback using a light beam on an optical information recording medium having a transparent protective layer, wherein the recording and playback is performed by scanning a light spot with its center displaced from the centerline of the information track on the optical information recording medium. An example of this type of optical information recording and playback apparatus is disclosed in Japanese Unexamined Patent Publication with a laid-open No. 8-77583. The configuration and features of this apparatus will be described below.

FIG. 7 is a diagram showing the configuration of a rewritable magneto-optical disk apparatus. In FIG. 7, reference numeral 41 is a magneto-optical disk, the information recording medium, formed from a transparent substrate of glass or plastic material with a magnetic film 42 formed thereon. The magneto-optical disk 41 is mounted on the rotational shaft of a spindle motor 43 and rotated at a prescribed speed by the rotation of the spindle motor 43. Below the optical information recording medium 41 is disposed an optical head 44, while a bias magnet 53 is disposed above the medium at a position opposite the optical head 44.

The optical head 44 contains a semiconductor laser 45 as a light source for recording and playback; when recording information, the light beam of the semiconductor laser 45 is modulated by a laser driving circuit not shown in accordance with the information signal to be written. The light beam emitted from the semiconductor laser 45 is first made parallel by a collimator lens 46, and then passes through a polarization beam splitter 47 and enters an objective lens 48. The incident light beam is converged by the objective lens 48 and focused as a microscopic spot onto the magnetic film 42 of the magneto-optical disk 41. In the meantime, a magnetic field oriented in a particular direction is applied from the bias magnet 43 to the magneto-optical disk 41, and a series of information bits is recorded by the application of this magnetic field and the projection of the modulated light beam.

The light beam projected on the magneto-optical disk 41 is reflected at the medium surface thereof. The reflected light again passes through the objective lens 48 and enters the polarization beam splitter 47 at whose polarization plane the light is reflected toward a beam splitter 49, thus being separated from the light coming from the semiconductor laser 45. The light beam reflected into the beam splitter 49 is separated into two beams, one of which is passed through a sensor lens 50 and received by a photosensor 51. The received light signal of the photosensor 51 is fed to an AT/AF circuit (autotracking, autofocus control circuit) 52 via an AT offset circuit 59 described later. Based on this signal, the AT/AF circuit generates a tracking error signal and a focus error signal. Using the thus generated tracking error signal and focus error signal, tracking control and focus control are performed by driving an objective lens actuator 54 and thereby moving the objective lens 48 in the tracking and focusing directions.

On the other hand, when playing back information recorded on the magneto-optical disk 41, the light beam of the semiconductor laser 45 is set at a reading power not high enough to affect the recorded information, and this reading light beam is directed to the intended track to read the recorded information. More specifically, the reading light beam reflected from the surface of the optical information recording medium is passed through the objective lens 48, the polarization beam splitter 47, the beam splitter 49, and a sensor lens 55, and received by a photosensor 56.

Next, off-tracking control will be described. Reference numeral 57 is an amplitude detection circuit for detecting the amplitude of a playback signal based on the received signal of the photosensor 56. The amplitude detection circuit 57 detects cross talk and the amplitude of the playback signal when determining the off-track direction of the reading light beam, and also when determining the amount of off-tracking. The detected values are fed into a CPU 58 via an A/D converter contained therein. The CPU 58 is a processor circuit for controlling various parts of the apparatus. When the magneto-optical disk 41 is loaded into the apparatus, the CPU 58 controls the various parts to control the off-track direction and off-track amount of the reading light beam. Based on instructions from the CPU 58, the AT offset adding circuit 59 applies an offset to the AT/AF circuit 52 to displace the reading light beam off-track in the desired direction by the desired amount.

Means for determining the off-track direction will be described. When the magneto-optical disk 41 is tilted toward its outer circumference relative to the objective lens 48, as shown in FIG. 8(a), a crescent-shaped secondary spot 801b is formed on the disk surface at a position outside the main spot 801a and displaced toward the outer circumference, resulting in increased cross talk from the outer track. On the other hand, when the magneto-optical disk 41 is tilted toward its inner circumference relative to the objective lens 48, as shown in FIG. 8(b), a crescent-shaped secondary spot 802b is formed on the disk surface at a position outside the main spot 802a and displaced toward the inner circumference, resulting in increased cross talk from the inner track.

Accordingly, by measuring the amount of cross talk from each of the adjacent tracks, the tilting direction of the magneto-optical disk 41 relative to the objective lens 48 can be identified, and thus the off-track direction of the light spot to reduce the amount of cross talk can be determined. More specifically, in the case of FIG. 8(a), the outer circumferential direction is determined as the off-track direction, and in the case of FIG. 8(b), the inner circumferential direction is determined as the off-track direction.

A prior art example of determining the off-track direction will be described below. A longest pattern signal is recorded in a test area provided on a magneto-optical disk. Then, its adjacent tracks are played back, and the amplitudes of the playback signals are compared. Based on the result of the comparison, the relative tilting direction of the optical information recording medium can be identified, and thus the off-track direction of the light spot to reduce the amount of cross talk can be determined.

Next, means for determining the off-track amount will be described. While varying the off-track amount, a reading light beam is projected a predetermined number of times onto the track of the test area where the longest pattern signal is recorded. The off-track amount is obtained from the playback signal detected at this time or from the amount of cross talk leaking from specific tracks obtained by playing back the adjacent tracks.

However, the off-track amount that maximizes the amplitude of the playback signal does not necessarily coincide with the off-track amount that minimizes the cross talk; therefore, it is desirable that the off-track amount that maximizes the difference between the two quantities, as shown in FIG. 9, be determined as the optimum value.

Operation will be described when playing back information recorded on the magneto-optical disk 41 by using the thus determined off-track direction and off-track amount.

First, the CPU 58 reads the off-track direction and off-track amount from its internal memory and, based on the direction and amount, controls the AT offset adding circuit 59. For example, when the off-track direction is the inner circumferential direction, and the off-track amount is a prescribed number of micrometers, the corresponding control signal is applied from the CPU 58 to the AT offset adding circuit 59. Upon receiving the control signal, the AT offset adding circuit 59 applies an offset corresponding to the off-track direction and off-track amount to the AT/AF circuit 52. The AT/AF circuit 52 then supplies a driving signal corresponding to the offset to the objective lens actuator 54, and the objective lens 48 is controlled in accordance with the driving signal. The reading beam emitted from the semiconductor laser 45 is thus displaced off-track by the prescribed number of micrometers in the inner circumferential direction of the optical information recording medium, and subsequent playback of the recorded information is performed with the reading light beam thus displaced off-track.

The above technique can be applied not only to optical information recording and playback apparatuses but also to apparatuses for playing back, for example, read-only recording media or playback apparatuses for write-once recording media.

The above-described optical information recording and playback apparatus requires the provision of a test area where a prescribed signal is recorded for the measurement of cross talk, and must be designed to be able to also handle optical information recording media that do not have such a test area.

Furthermore, the direction in which the center of the light spot on the optical information recording medium is displaced from the centerline of the information track, and which is determined so as to minimize the cross talk, is not always the direction that enhances the playback signal quality of the optical information recording and playback apparatus. There is, therefore, a need for a method that can more suitably determine the direction and amount to displace the center of the light spot.

SUMMARY OF THE INVENTION

In view of the problem associated with the prior art optical information recording and playback apparatus, it is an object of the present invention to provide an optical information recording and playback apparatus that can reduce the degradation of recording/playback signal quality caused by the tiling of the optical information recording medium relative to the light beam.

It is another object of the present invention to provide an optical information recording and playback apparatus that can shorten the time required to determine the optimum position to which the light spot is to be displaced when reducing the degradation of recording/playback signal quality caused by the tiling of the optical information recording medium relative to the light beam.

One aspect of the present invention is an optical information recording and playback apparatus comprising:

a light source;

a focusing optical system for focusing a light beam from said light source into a microscopic spot on a recording surface of an optical information recording medium having a transparent protective layer;

a light detector for receiving the light beam reflected or diffracted at the recording surface of said optical information recording medium, and for converting said received light beam into an electrical signal;

a signal circuit for converting said electrical signal into a playback information signal;

a signal circuit for generating from said electrical signal an error signal indicating a positional displacement between an information track and the light spot on the recording surface of said optical information recording medium; and driving means for causing said light spot to follow said information track on said optical information by using said error signal, said optical information recording and playback apparatus characterized by the inclusion of:

means for measuring the tilt of said optical information recording medium relative to said focusing optical system; and an off-tracking circuit for displacing said light spot in a direction that reduces jitter of a playback signal obtained by playing back information recorded on said optical information recording medium from said information track, by giving an electrical offset to an error signal indicating a displacement in a direction parallel to said optical information recording medium and perpendicular to a scanning direction of said light spot, said error signal being among the error signals supplied to said driving means for causing said light spot to follow said information track on said optical information.

With this configuration, degradation of recording/playback signal quality due to the tilting of the optical information recording medium relative to the focusing optical system can be reduced.

Another aspect of the present invention is an optical information recording and playback apparatus comprising a jitter detection device for detecting the jitter of the playback signal obtained by playing back information recorded on said optical information recording medium, and wherein the tilt of said optical information recording medium relative to said focusing optical system is measured by using the amount of increase in said playback signal jitter.

This configuration achieves the effect of being able to easily measure the amount of tilting of the optical information recording medium relative to the focusing optical system, as well as the effect of reducing the degradation of recording/playback signal quality caused by the tilting of the optical information recording medium relative to the focusing optical system.

Still another aspect of the present invention is an optical information recording and playback apparatus, wherein said means for measuring the tilt of said optical information recording medium relative to said focusing optical system is a tilt detection device comprising (1) a tilt detection light source, (2) a tilt detection focusing optical system for focusing a light beam from said tilt detection light source, and (3) a tilt detection light detector for projecting said tilt detection light beam onto said optical information recording medium, and for receiving light reflected from said optical information recording medium for conversion into an electrical signal.

This configuration achieves the effect of measuring the tilt of the optical information recording medium relative to the focusing optical system, as well as the effect of reducing the degradation of recording/playback signal quality caused by the tilting of the recording surfaced of the optical information recording medium.

Yet another aspect of the present invention is an optical information recording and playback apparatus, wherein said means for measuring the tilt of said optical information recording medium relative to said focusing optical system comprises a focus drive amount detection device for detecting a focus drive amount representing a drive amount in a direction perpendicular to said optical information recording medium, said focus drive amount being among said error signals supplied to said driving means, and wherein said tilt is measured based on said focus drive amount and a position currently being measured on said optical information recording medium.

This configuration achieves the effect of being able to easily measure the-tilt of the optical information recording medium relative to the focusing optical system, as well as the effect of reducing the degradation of recording/playback signal quality caused by the tilting of the optical information recording medium relative to the focusing optical system.

Still yet another aspect of the present invention is an optical information recording and playback apparatus, wherein said means for measuring the tilt of said optical information recording medium relative to said focusing optical system comprises a focus drive amount detection device for detecting a focus drive amount representing a drive amount in a direction perpendicular to said optical information recording medium, said focus drive amount being among said error signals supplied to said driving means, and wherein said tilt is measured based on said focus drive amount.

This configuration achieves the effect of being able to easily measure the tilt of the optical information recording medium relative to the focusing optical system, as well as the effect of reducing the degradation of recording/playback signal quality caused by the tilting of the optical information recording medium relative to the focusing optical system.

A further aspect of the present invention is an optical information recording and playback apparatus, comprising a jitter detection device for detecting the jitter of the playback signal obtained by playing back recorded information from said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize said playback signal jitter.

This configuration achieves the effect of determining the optimum off-track position and the effect of measuring the tilt of the optical information recording medium relative to the focusing optical system, as well as the effect of reducing the degradation of recording/playback signal quality caused by the tilting of the optical information recording medium relative to the focusing optical system.

A still further aspect of the present invention is an optical information recording and playback apparatus, comprising an error rate detection device for detecting an error rate, the rate at which the playback signal obtained by playing back recorded information from said optical information recording medium is in error when reproduced from an information signal written on said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize said error rate.

This configuration achieves the effect of determining the optimum off-track position and the effect of measuring the tilt of the optical information recording medium relative to the focusing optical system, as well as the effect of reducing the degradation of recording/playback signal quality caused by the tilting of the optical information recording medium relative to the focusing optical system.

A yet further aspect of the present invention is an optical information recording and playback apparatus, comprising a flag detection device for detecting a flag that is set when there is a certain amount of error in a certain amount of information by comparing the playback signal obtained by playing back recorded information from said optical information recording medium with an information signal written on said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize the number of flags in said amount of information.

This configuration achieves the effect of determining the optimum off-track position and the effect of measuring the tilt of the optical information recording medium relative to the focusing optical system, as well as the effect of reducing the degradation of recording/playback signal quality caused by the tilting of the optical information recording medium relative to the focusing optical system.

A still yet further aspect of the present invention is an optical information recording and playback apparatus, comprising an RF signal detection device for detecting the amplitude of the playback signal obtained by playing back recorded information from said optical information recording medium, and wherein said off-tracking circuit includes means for varying (1) an off-track direction, the direction in which said light spot is to be displaced, and (2) an off-track amount, the amount by which said light spot is to be displaced, in such a manner as to maximize said playback signal amplitude.

This configuration achieves the effect of determining the optimum off-track position and the effect of measuring the tilt of the optical information recording medium relative to the focusing optical system, as well as the effect of reducing the degradation of recording/playback signal quality caused by the tilting of the optical information recording medium relative to the focusing optical system.

An additional aspect of the present invention is an optical information recording and playback apparatus, wherein said off-tracking circuit includes means for setting the off-track amount, the amount by which said light spot is to be displaced, as fixed values providing one value on the inside of said information track and one value on the outside thereof as viewed in the direction normal to the scanning direction of said light spot.

This configuration achieves the effect of reducing the time required to determine the off-track amount, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

A still additional aspect of the present invention is an optical information recording and playback apparatus, wherein said off-tracking circuit includes means for setting the off-track amount, the amount by which said light spot is to be displaced, as fixed values providing more than one value on the inside of said information track and more than one value on the outside thereof as viewed in the direction normal to the scanning direction of said light spot.

This configuration achieves the effect of reducing the time required to determine the off-track amount, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

A yet additional aspect of the present invention is an optical information recording and playback apparatus, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for varying an off-track amount, the amount by which said light spot is to be displaced, in accordance with the degree of the tilting of said optical information recording medium relative to said focusing optical system.

This configuration achieves the effect of reducing the time required to determine the off-track direction, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

A still yet additional aspect of the present invention is an optical information recording and playback apparatus, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for setting an off-track amount, the amount by which said light spot is to be displaced, as fixed values providing one value on the inside of said information track and one value on the outside thereof as viewed in the direction normal to the scanning direction of said light spot.

This configuration achieves the effect of reducing the time required to determine the off-track amount, the effect of reducing the time required to determine the off-track direction, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

One aspect of the present invention is an optical information recording and playback apparatus, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for setting an off-track amount, the amount by which said light spot is to be displaced, as fixed values providing more than one value on the inside of said information track and more than one value on the outside thereof as viewed in the direction normal to the scanning direction of said light spot.

This configuration achieves the effect of reducing the time required to determine the off-track amount, the effect of reducing the time required to determine the off-track direction, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

Another aspect of the present invention is an optical information recording and playback apparatus, comprising means for splitting said optical information recording medium into a prescribed number of areas according to the amount of warping contained in said optical information recording medium, and for measuring the tilt of said optical information recording medium relative to said focusing optical system each time switching is made from one area to another.

This configuration achieves the effect of reducing the time required to determine the off-track amount, the effect of reducing the time required to determine the off-track direction, the effect of determining the off-track position, and the effect of measuring the tilt of the optical information recording medium relative to the focusing optical system, as well as the effect of reducing the degradation of recording/playback signal quality caused by the tilting of the optical information recording medium relative to the focusing optical system.

As described above, provisions are made in the present invention to determine the direction of displacement and the amount of displacement, for example, when scanning a light spot on the optical information recording medium by displacing the center of the light spot from the centerline of the information track to reduce jitter of the playback signal. The apparatus thus configured can also handle optical recording media that do not have a test area. Furthermore, the direction in which the center of the light spot is displaced and the amount of displacement can be limited, achieving the effect of reducing the time required to determine the optimum position to which the light spot is displaced.

BRIEF DESCRIPTION OF THE DRAWINGS

FIG. 4(a) is a diagram showing the intensity distribution of a light spot when, due to R tilt (radial tilt) an optical disk recording medium is tilted with the inner circumference of the disk lying closer to the incidence side of a light beam than the outer circumference thereof;

FIG. 4(b) is a diagram showing the intensity distribution of the light spot when, due to R tilt, the optical disk recording medium is tilted with the inner circumference of the disk lying closer to the incidence side of the light beam than the outer circumference thereof;

DESCRIPTION OF THE REFERENCE NUMERALS

1. OPTICAL INFORMATION RECORDING MEDIUM
2. TRANSPARENT PROTECTIVE LAYER
3. SPINDLE MOTOR
4. OPTICAL HEAD
5. SEMICONDUCTOR LASER
6. POLARIZATION BEAM SPLITTER
7. QUARTER-WAVE PLATE
9. PHOTOSENSOR
10. JITTER DETECTION DEVICE
11. CPU
12. OFF-TRACK ADDING CIRCUIT
13. FOCUS/TRACKING SERVO CIRCUIT
14. OBJECTIVE LENS ACTUATOR
15. TILT DETECTION DEVICE
16. FOCUS DRIVE AMOUNT DETECTION DEVICE
41. MAGNETO-OPTICAL DISK
42. MAGNETIC FILM
43. SPINDLE MOTOR
44. OPTICAL HEAD
45. SEMICONDUCTOR LASER
46. COLLIMATOR LENS
47. POLARIZATION BEAM SPLITTER
48. OBJECTIVE LENS
49. BEAM SPLITTER
50. SENSOR LENS
51. PHOTOSENSOR
52. AT/AF CIRCUIT
53. BIAS MAGNET
54. OBJECTIVE LENS ACTUATOR
55. SENSOR LENS
56. PHOTOSENSOR
57. AMPLITUDE DETECTION CIRCUIT
58. CPU
59. AT OFFSET APPLICATION CIRCUIT

DESCRIPTION OF THE PREFERRED EMBODIMENTS

Embodiments of the optical information recording and playback apparatus of the present invention will be described below with reference to the-accompanying drawings.

(Embodiment 1)

Figure 1:
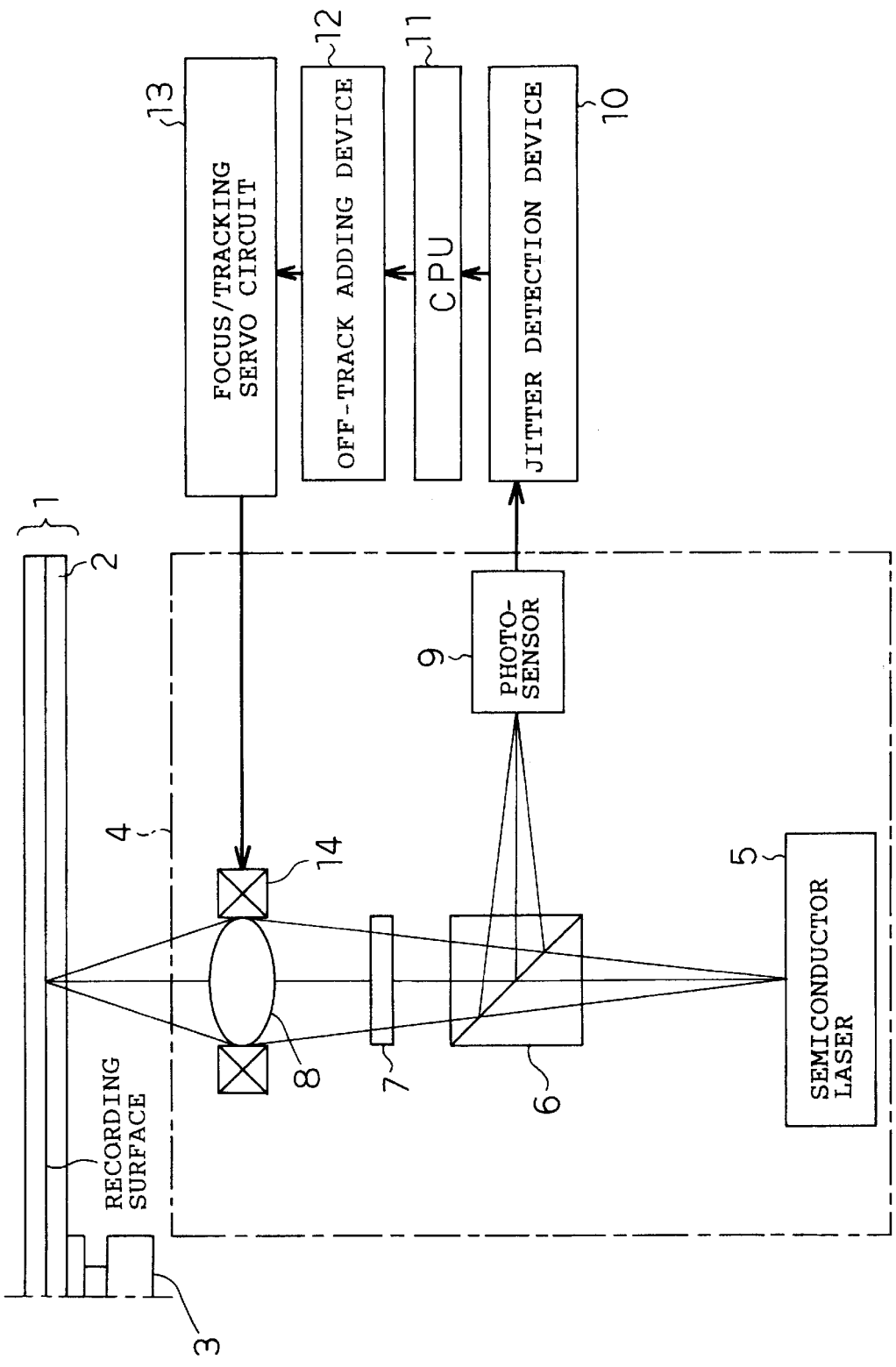
FIG. 1 is a block diagram of an optical information recording and playback apparatus according to a first embodiment of the present invention, which includes a jitter detection device and off-track adding device.

FIG. 1 is a diagram showing the configuration of an optical information recording and playback apparatus according to a first embodiment of the present invention.

The configuration of this embodiment will be described below with reference to FIG. 1. The configuration shown in the figure differs from the prior art optical information recording and playback apparatus by the inclusion of a jitter detection device 10 and off-track adding device 12.

In FIG. 1, the jitter detection device 10 performs the function of detecting jitter of a playback signal, while the off-track adding device 12 performs the function of displacing the center of a light spot from the centerline of an information track on an optical information recording medium.

This embodiment concerns one embodiment of the present invention described in claims 1, 2, 6, 7, 8, 9, 10, 11, and 15 of the invention.

In this embodiment, an optical disk recording medium is used as the optical information recording medium. In this specification, the term R tilt (radial tilt) refers to the tilt of the optical disk recording medium relative to focusing optics in a direction normal to the scanning direction of the light spot on the optical disk recording medium.

Referring now to FIGS. 4(a) and 4(b), a description will be given of why jitter of the playback signal increases if there is an R tilt between the optical disk recording medium and the focusing optics.

FIGS. 4(a) and 4(b) illustrate the intensity distribution of the light spot when there is an R tilt.

FIG. 4(a) is a diagram showing the intensity distribution of the light spot when, because of the R tilt, the optical disk recording medium is tilted with the inner circumference of the disk lying closer to the incidence side of the light beam than the outer circumference thereof.

In the absence of R tilt, the center 401a of the main beam is substantially aligned with the theoretical center obtained from the phase difference TE signal, as shown at reference numeral 401 in the figure. However, in the presence of R tilt, the center 402a of the main beam shifts toward the outer circumference, as shown at reference numeral 402 in the figure.

This is the first factor contributing to increased jitter.

Further, as shown in the figure, coma occurs because of the presence of R tilt and the protective layer of the optical disk recording medium. This is the second factor contributing to increased jitter.

FIG. 4(b) is a diagram showing the intensity distribution of the light spot when, because of the R tilt, the optical disk recording medium is tilted with the outer circumference of the disk lying closer to the incidence side of the light beam than the inner circumference thereof. Here also, the same factors as given in FIG. 4(a) contribute to increased jitter, the only difference being that, in FIG. 4(b), the main beam shifts in the opposite direction and the coma is produced on the opposite side across the optical axis.

To address the first jitter increase due to the main beam shift, in the case of FIG. 4(a), playback is performed by displacing the light spot in the direction of the inner circumference of the optical disk recording medium (as indicated at reference numeral 403 in the figure), while in the case of FIG. 4(b), playback is performed by displacing the light spot in the direction of the outer circumference of the optical disk recording medium (as indicated at reference numeral 404 in the figure), thus bringing the center of the main beam closer to the theoretical center obtained from the phase difference TE signal. This is the method of the present invention for suppressing the jitter increase due to the R tilt.

Though the jitter due to coma cannot be eliminated, this method offers an enormous effect in suppressing the jitter increase due to the R tilt.

Figure 5:
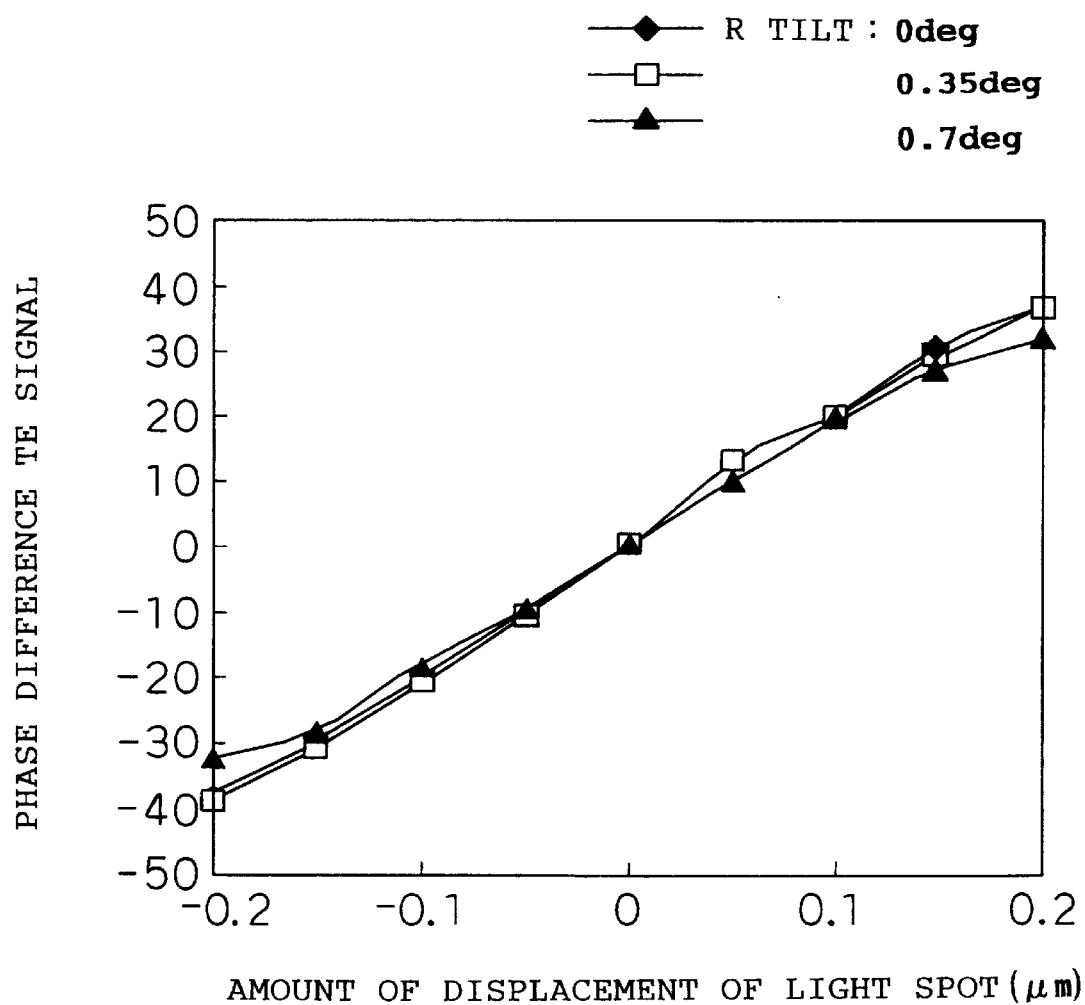
FIG. 5 is a diagram showing the relationship between a phase difference TE signal and the amount of displacement of the light spot in the presence of R tilt.

FIG. 5 shows the relationship between the phase difference TE (tracking error) signal and the amount of displacement of the light spot in the presence of R tilt.

As shown in FIG. 5, the zero cross point of the phase difference TE signal, that is, the theoretical center obtained from the phase difference TE signal, always indicates about the center of the information track on the optical disk recording medium, regardless of the presence or absence of R tilt. Further, the relationship between the phase error TE signal and the amount of displacement of the light spot is not affected by the presence or absence of R tilt.

From the above, it can be seen that the phase difference TE signal, which is independent of the variation of the R tilt, is suitable as the TE signal for accurately displacing the light spot. Accordingly, the phase difference TE signal is used as the TE signal in the optical information recording and playback apparatus of the present embodiment.

Referring again to FIG. 1, the configuration for playing back the optical disk recording medium according to the first embodiment will be described below.

Reference numeral 1 is the optical disk recording medium which is provided with a transparent protective layer 2. The optical disk recording medium is mounted on the rotational shaft of a spindle motor 3 and rotated at a prescribed speed by the rotation of the spindle motor 3. An optical head 4 is disposed below the optical disk recording medium 1.

The optical head 4 contains a semiconductor laser 5 which emits light by being driven by a laser driving circuit not shown. The emitted light beam passes through a polarization beam splitter 6 and enters an objective lens 8. The light beam is then focused onto the recording surface of the optical disk recording medium.

The reflected light again passes through the objective lens 8 and enters the polarization beam splitter 6. Since the polarization state of the light has been changed on the way by a quarter-wave plate 7, the light is reflected at the polarization plane of the polarization beam splitter 6 and received by a photosensor 9.

The received light is used to derive a playback signal and a servo control signal. A CPU 11 takes in the servo control signal and issues an instruction to a focus/tracking servo circuit 13 to make the light spot follow the information track on the optical disk recording medium.

As a result, the focus/tracking servo circuit 13 applies a driving current to an objective lens actuator 14; the light spot is thus made to follow the information track on the optical disk recording medium, and the playback signal is obtained.

Next, a description will be given of the configuration of a means for detecting the amount of R tilt based on the amount of increase in playback signal jitter.

While the light spot is being maintained on the information track on the optical disk recording medium by the focus/tracking servo circuit 13, the jitter detection device 10 detects jitter based on the playback signal fed from the photosensor 9.

The CPU 11 takes in the detected jitter value, and compares this jitter value with a jitter reference value obtained by adding an allowable jitter increase amount to the value of jitter detected at start-up at the innermost portion of the optical disk recording medium where the R tilt is the smallest.

If the detected jitter value of the playback signal is worse than the jitter reference value, it is determined that the amount of the tilt is such a degree that requires an off-tracking operation.

The configuration for performing the off-tracking operation will be described below.

The off-tracking here means displacing the light spot in a direction normal to the scanning direction of the light spot.

When the CPU 11 judges that the detected jitter value is worse than the reference value, control is performed to displace the light spot.

The off-track adding device 12 applies an electrical offset to a tracking servo section of the focus/tracking servo circuit 13 in accordance with the instruction from the CPU 11. Then, a driving current corresponding to the offset is supplied to the objective lens actuator 14. As a result, the light spot is displaced off center. The configuration for performing the off-tracking operation will be referred to as the off-tracking circuit.

The following four configurations are examples of the means used to determine the optimum off-track position. Any of the following configuration examples can be used in the present embodiment.

The first configuration is a means wherein jitter is detected using the jitter detection device 10 and the off-tracking operation is repeated until the jitter is minimized.

The second configuration is a means wherein an error rate detection device not shown detects an error rate, the rate at which the playback signal obtained by playing back recorded information from the optical disk recording medium is in error when reproduced from an information signal written on the optical disk recording medium, and the off-tracking operation is repeated until the error rate is minimized.

The third configuration is a means wherein a C1 flag detection device not shown detects the number of C1 flags that are set when there is a certain amount of error in (a certain amount of) information by comparing the playback signal obtained by playing back recorded information from the optical disk recording medium with the information signal written on the optical disk recording medium, and the off-tracking operation is repeated until the number of detected C1 flags is minimized.

The fourth configuration is a means wherein an RF signal detection device not shown detects the amplitude of the playback signal and the off-tracking operation is repeated until the amplitude of the playback signal is maximized.

Further, the optimum off-track position determining means can be simplified.

Figure 6:
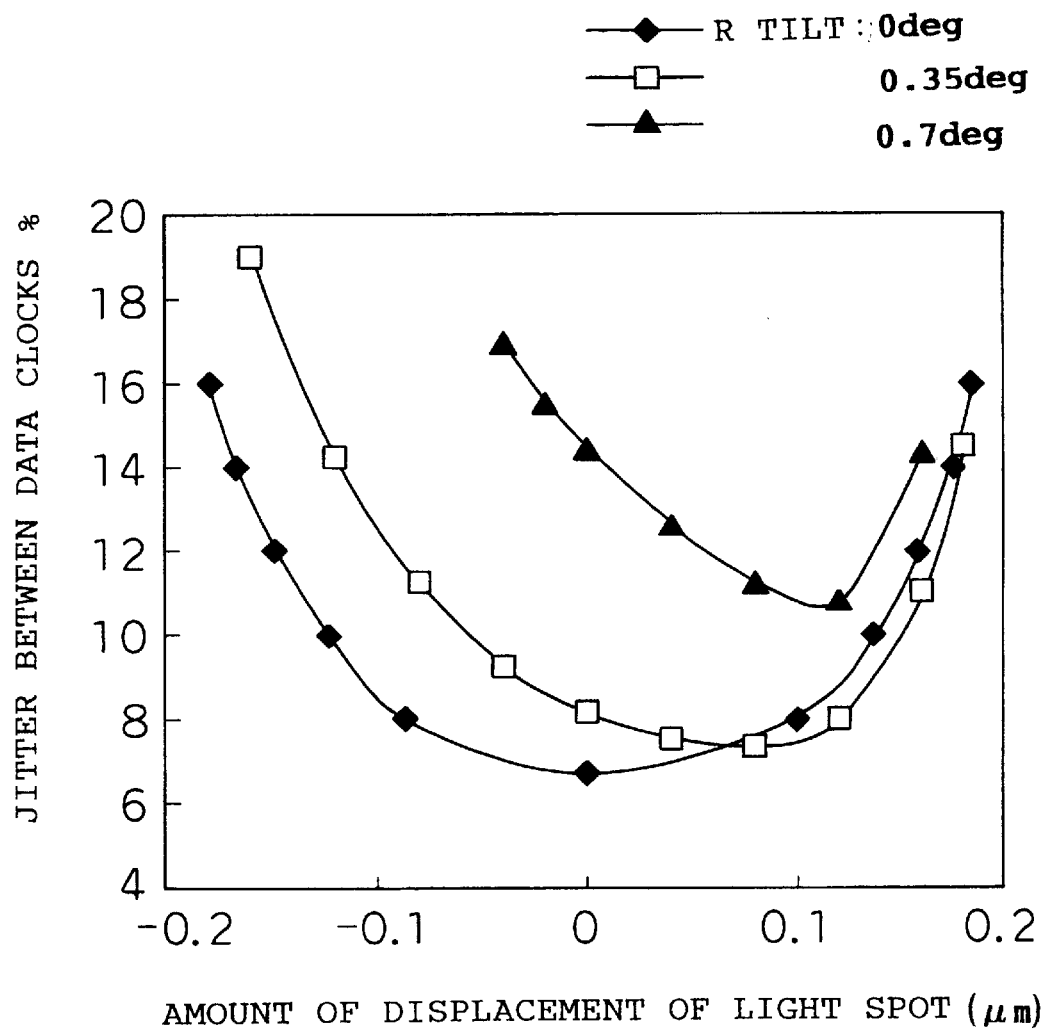
FIG. 6 is a diagram showing the relationship between playback signal jitter and the amount of displacement of the light spot in the presence of R tilt.
Figure 7:
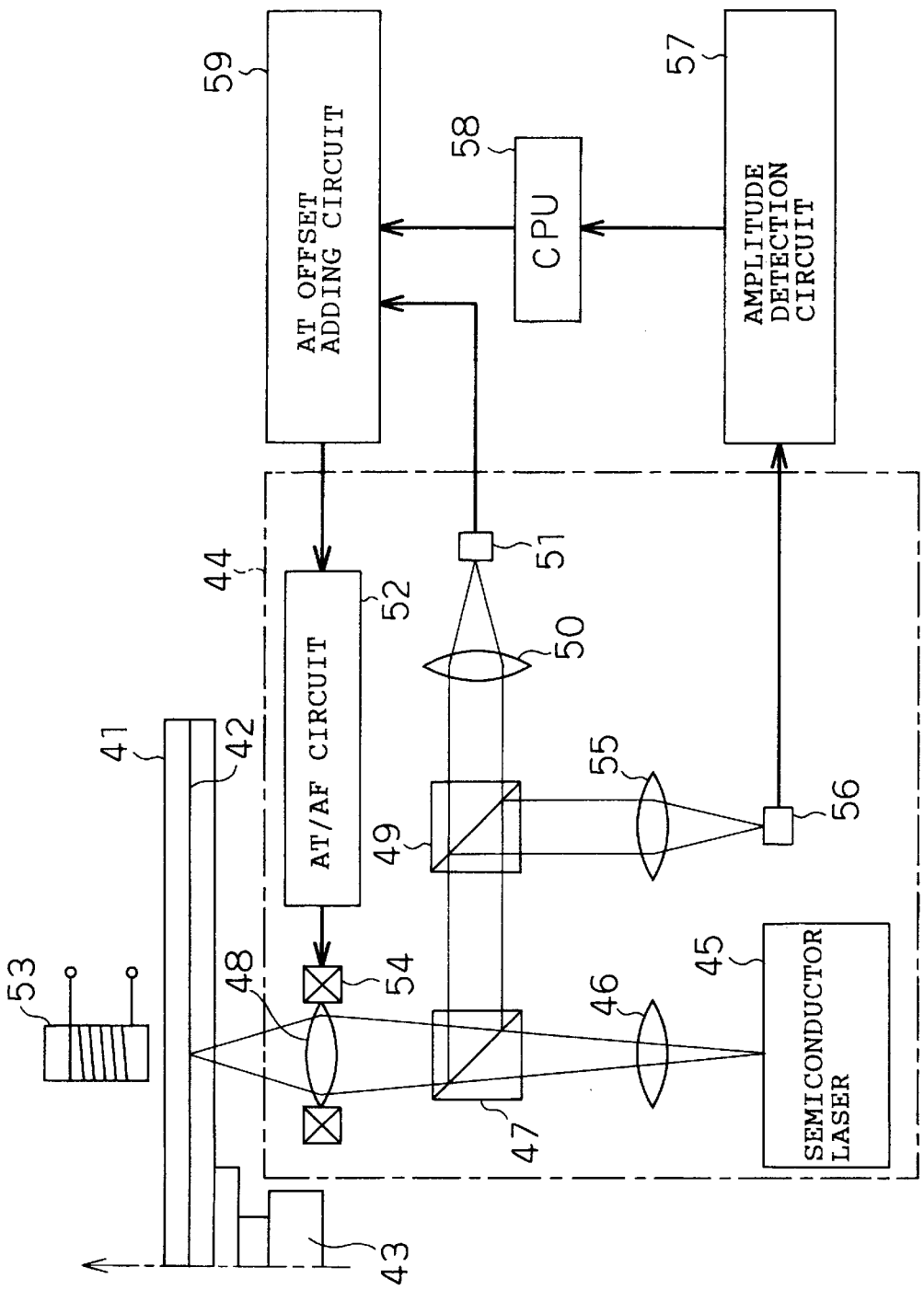
FIG. 7 is a block diagram showing the configuration of a rewritable magneto-optical disk apparatus according to the prior art.
Figure 8A:
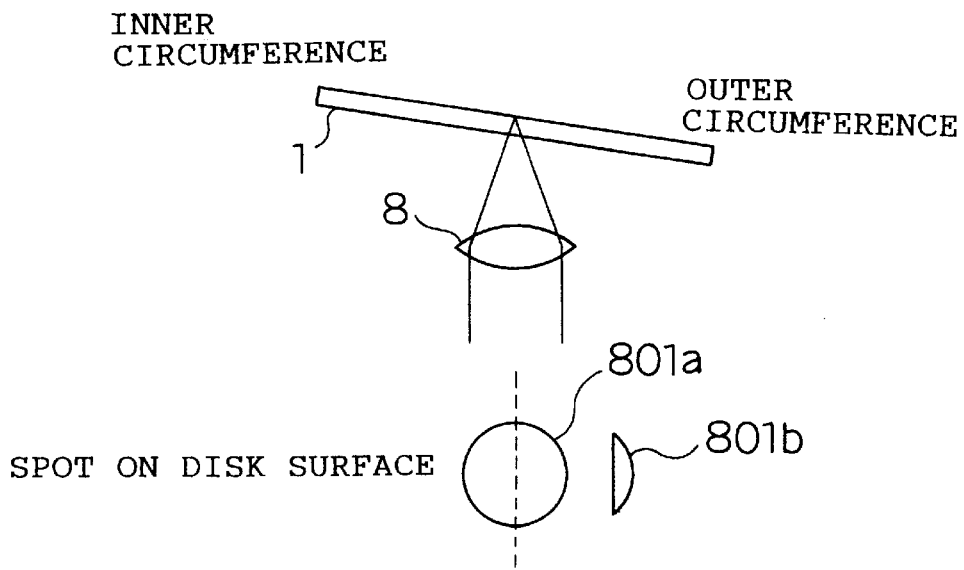
FIG. 8(a) is a diagram showing how a spot is formed on the disk surface when the recording medium is tilted toward its outer circumference relative to an objective lens in the prior art apparatus.
Figure 8B:
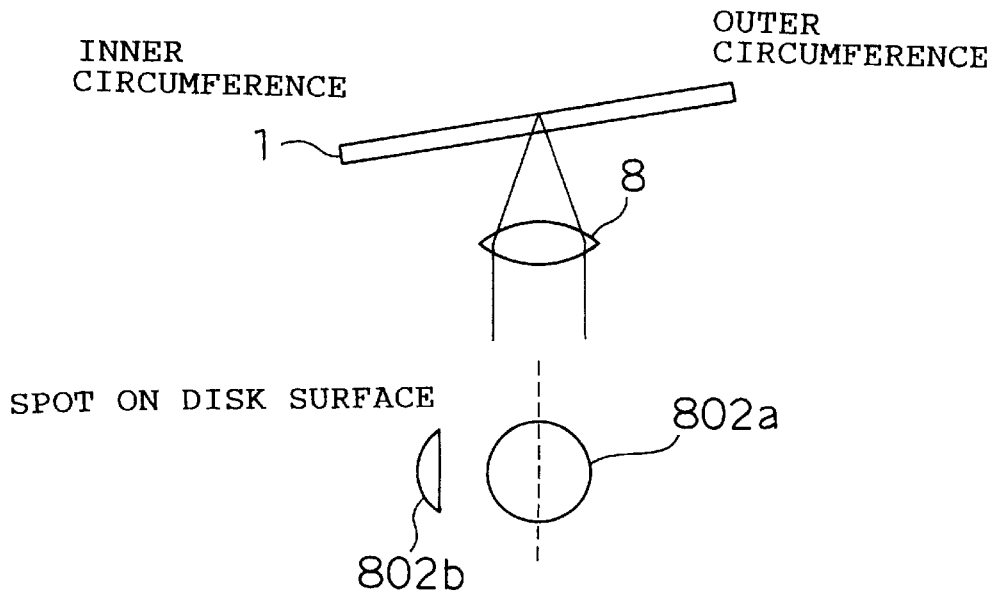
FIG. 8(b) is a diagram showing how a spot is formed on the disk surface when the recording medium is tilted toward its inner circumference relative to an objective lens in the prior art apparatus.
Figure 9:
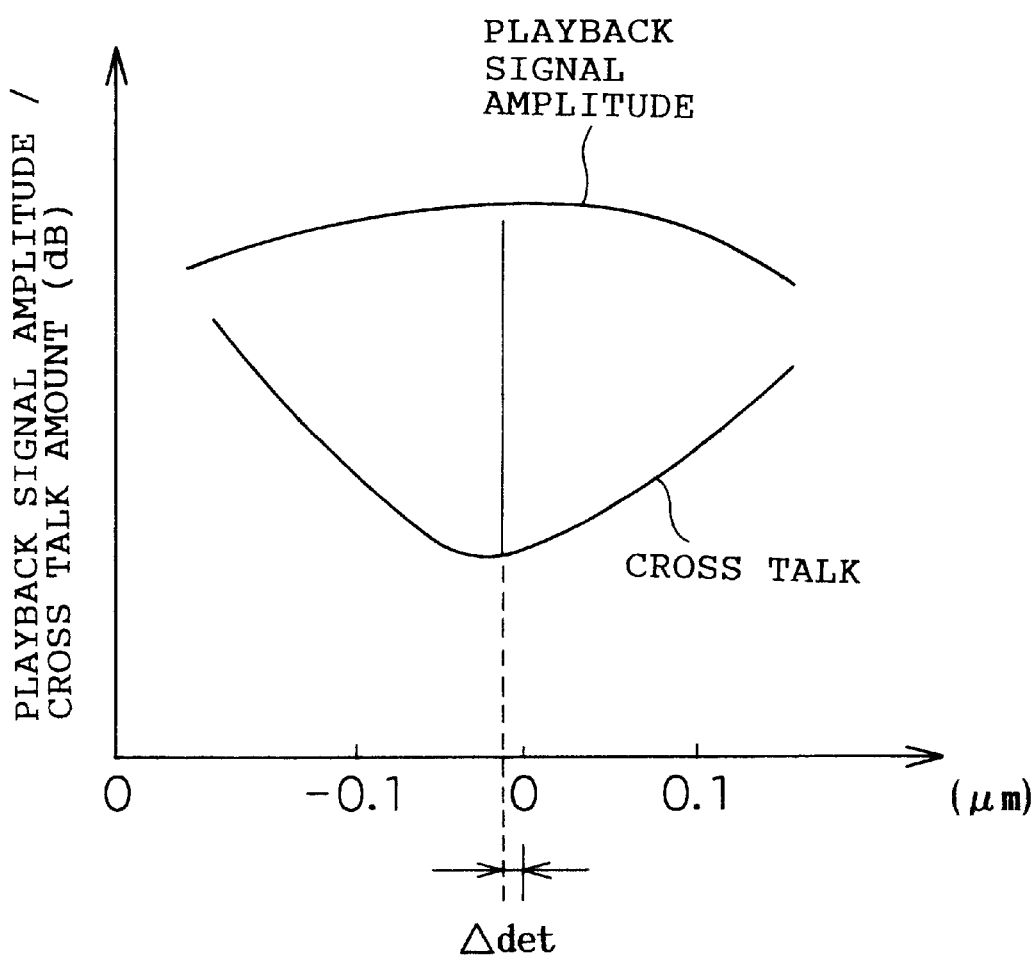
FIG. 9 is a diagram showing the results of measurements when cross talk and playback signal amplitude are measured while varying a reading light beam.

This will be explained below. FIG. 6 shows the relationship between the amount of displacement of the light spot and the jitter of the playback signal in the presence of R tilt.

The optical disk recording medium used here is a single-layer DVD disk having a transparent protective layer thickness of 0.6 mm, a track pitch of 0.74 $\mu$m, and a minimum pit length of 0.40 $\mu$m. The results show that the amount by which the light spot is displaced according to the R tilt to achieve the best jitter result for the playback signal is 0.08 $\mu$m for an R tilt of 0.35 deg. and 0.11 $\mu$m for an R tilt of 0.7 deg., the values thus clustering around 0.1 $\mu$m.

From these results, it can be seen that the amount of displacement of the light spot can be fixed at a predetermined value. Means using fixed values can be accomplished either by a means that sets the amount of displacement as fixed values providing one value on the inner circumferential side and one value on the outer circumferential side as viewed in the direction normal to the scanning direction of the light spot, or by a means that sets the amount of displacement as fixed values providing more than one value on the inner circumferential side and more than one value on the outer circumferential side as viewed in the direction normal to the scanning direction of the light spot.

From the results of FIG. 6 it has been found that an effect equivalent to that obtained with the means that displaces the light spot to the optimum off-track position can be achieved using the means that sets one fixed value on the inner circumferential side and one fixed value on the outer circumferential side as viewed in the direction normal to the scanning direction of the light spot. Accordingly, the means using such fixed values is advantageous since it can reduce the time required to determine the amount of displacement of the light spot.

In the present embodiment, the single-layer DVD disk was played back under the following conditions.

First, the reference value stored in the CPU was set at 14%, i.e., 6.8% representing the jitter between data clocks at the innermost portion plus 7.2% which is the allowable jitter increase amount. The predetermined amount by which the light spot was displaced was set at 0.1 $\mu$m, which corresponds to ⅛ of the track pitch.

As a result, when the R tilt was 0.7 deg., the jitter between data clocks was improved nearly 4% by displacing the center of the light spot from the centerline of the information track.

Further, if the optical disk recording medium is split into a number of areas in the radial direction, with provisions made to measure the jitter of the playback signal each time the playback area changes from one area to the next, the time spent in the process of detecting jitter and performing control according to the detected jitter can be reduced compared with the above-described configuration which constantly measures the jitter of the playback signal.

(Embodiment 2)

Figure 2:
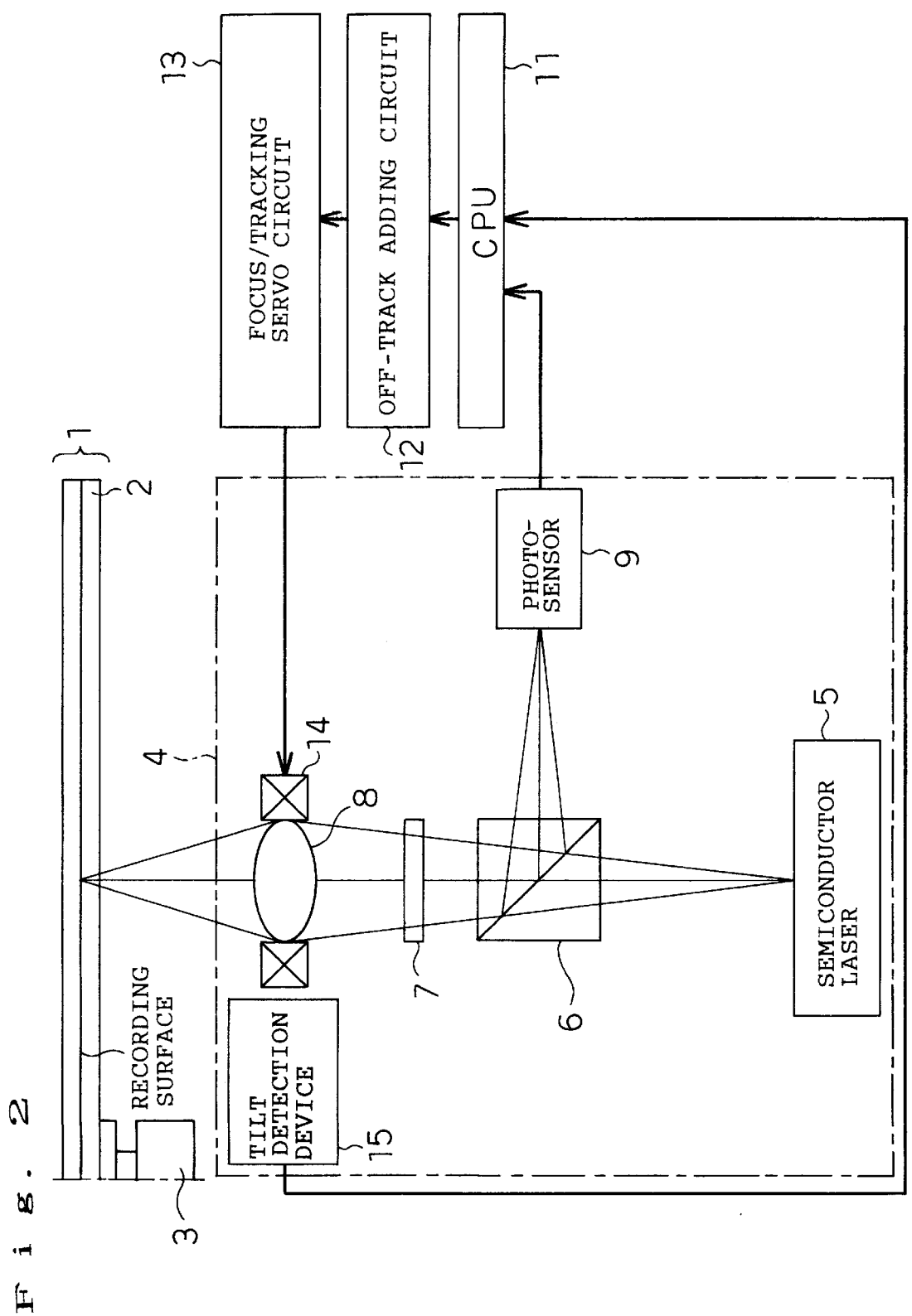
FIG. 2 is a block diagram of an optical information recording and playback apparatus according to a second embodiment of the present invention, which includes a tilt detection device and off-track adding device.

FIG. 2 is a diagram showing the configuration of an optical information recording and playback apparatus according to a second embodiment of the present invention.

The configuration of this embodiment will be described below with reference to FIG. 2. The configuration shown in the figure differs from the prior art optical information recording and playback apparatus by the inclusion of a tilt detection device 15 and off-track adding device 12.

In FIG. 2, the tilt detection device 15 performs the function of detecting the tilt of the optical information recording medium relative to the focusing optics, while the off-track adding device 12 performs the function of displacing the center of the light spot from the centerline of the information track on the optical information recording medium.

This embodiment concerns one embodiment of the present invention described in claims 1, 3, 6, 7, 8, 9, 10, 11, 12, 13, 14, and 15 of the invention.

In this embodiment, in the optical disk recording medium playback configuration the same elements as those in the first embodiment are designated by the same reference numerals, and descriptions of such elements will not be repeated here.

In the second embodiment, a description will be given of the configuration of the means for detecting the amount of R tilt and the direction of the R tilt by using the tilt detection device 15.

The tilt detection device 15 comprises a light source, focusing optics, and a light detector.

The light beam emitted from the tilt detection device 15 is projected onto the optical disk recording medium 1, and the reflected light is detected by the light detector in the tilt detection device 15. The amount of R tilt is detected from the variation of the reflected light.

The detected tilt amount is compared with a tilt reference value obtained by adding an allowable tilt amount to the value of the R tilt detected at start-up at the innermost portion of the optical disk recording medium where the R tilt is the smallest. If the detected tilt amount is larger than the tilt reference value, it is determined that the tilt amount is such a degree that requires an off-tracking operation.

The configuration for performing the off-tracking operation will be described below.

As in the first embodiment, the off-tracking operation. is performed using the off-tracking circuit.

To determine the optimum off-track position, the off-tracking operation is repeated using one of the four measures, i.e., the jitter of the playback signal, the error rate, the C1 flag, or the RF signal, as in the first embodiment.

Furthermore, as in the first embodiment, the off-track position determining means can be simplified by setting the off-track amount as fixed values, i.e., one fixed value or more than one fixed value on each of the inner and outer circumferential sides as viewed in the direction normal to the scanning direction.

In the second embodiment, the off-track direction determining means can also be simplified since the direction of the R tilt is known because of the provision of the tilt detection device.

It is also seen that the off-track direction that reduces the playback signal jitter is the same as the direction in which the inner circumference or the outer circumference of the optical disk recording medium is tilted toward the incidence side of the light beam, as previously shown in FIGS. 4(a) and 4(b). That is, in the case of FIG. 4(a), playback is performed by displacing the light spot in the direction of the inner circumference of the optical disk recording medium (as indicated at reference numeral 403 in the figure), while in the case of FIG. 4(b), playback is performed by displacing the light spot in the direction of the outer circumference of the optical disk recording medium (as indicated at reference numeral 404 in the figure).

Therefore, the CPU 11 controls the off-track direction in accordance with the direction of the R tilt.

The off-track amount determining means here can be accomplished by a means that obtains the optimum off-track position using one of the four measures, i.e., the jitter of the playback signal, the error rate, the C1 flag, or the RF signal, as in the first embodiment, a means that varies the off-track amount according to the amount of change of the R tilt, a means that provides one fixed value on each of the outer and inner circumferential sides as viewed in the direction normal to the scanning direction, or a means that provides more than one fixed value on each of the outer and inner circumferential sides as viewed in the direction normal to the scanning direction.

Next, detailed setting conditions and experimental results according to the present embodiment will be described.

The optical disk recording medium used here is a single-layer DVD disk having a transparent protective layer thickness of 0.6 mm, a track pitch of 0.74 $\mu$m, and a minimum pit length of 0.40 $\mu$m.

The reference value for the amount of R tilt was set at 0.5 deg. and the amount of displacement at ⅙ of the track pitch.

The direction of displacement was set the same as the direction in which the inner circumference or the outer circumference of the optical disk recording medium is tilted toward the incidence side of the light beam, as shown in FIGS. 4(a) and 4(b).

As a result, when an R tilt of 0.7 deg. was detected, the jitter between data clocks was improved nearly 4% by displacing the center of the light spot from the centerline of the information track.

Further, by splitting the optical disk recording medium into a number of areas in the radial direction, and making provisions to measure the R tilt each time the playback area changes from one area to the next, the time spent in the process of detecting the R tilt and performing control according to the detected R tilt can be reduced.

The tilt detection device is not limited to the above-described method, but the present invention can also be carried out by using, for example, a method that samples the light reflected from the specular surface of the disk and detects the R tilt using the tracking signal at that time.

(Embodiment 3)

Figure 3:
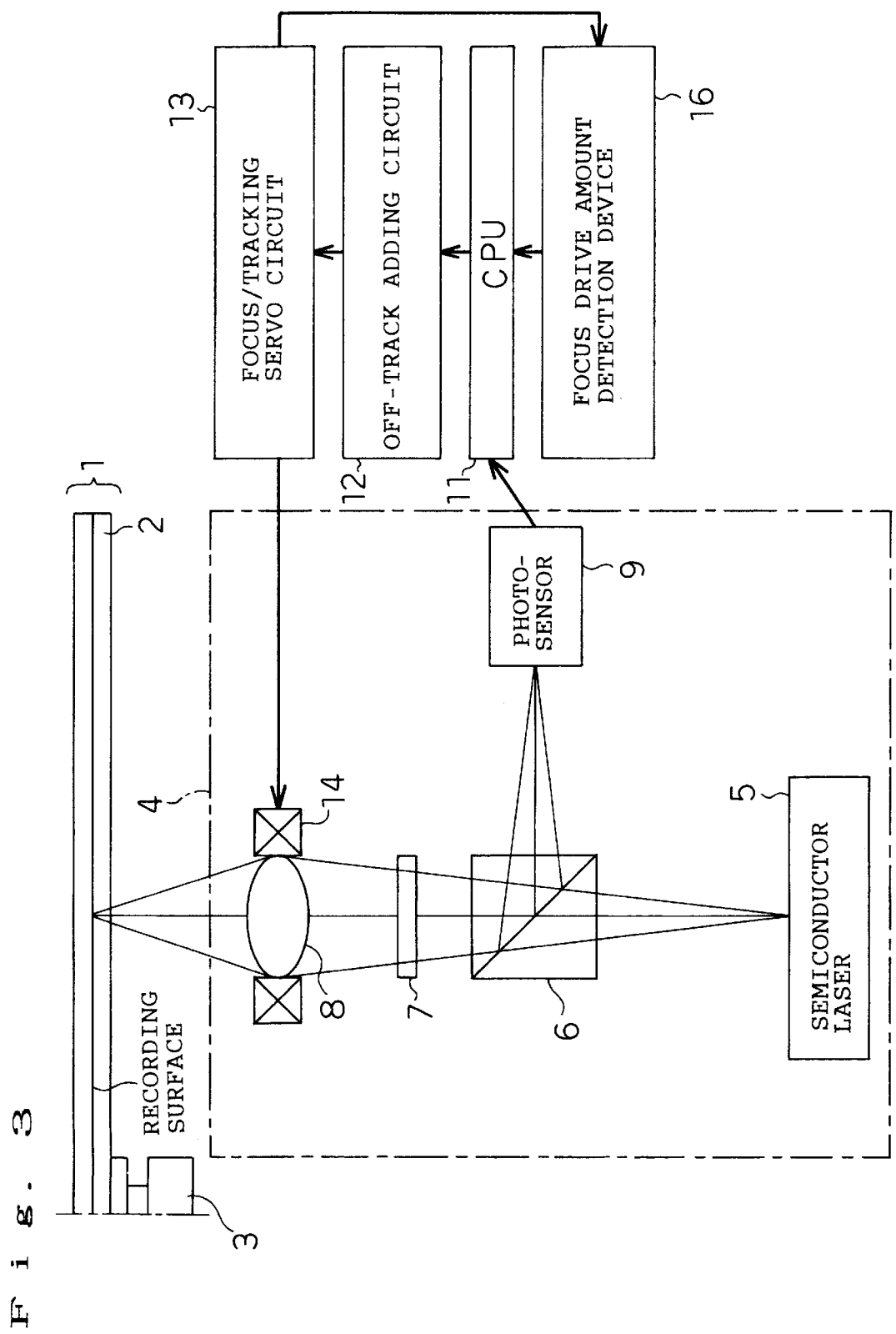
FIG. 3 is a block diagram of an optical information recording and playback apparatus according to a third embodiment of the present invention, which includes a focus drive amount detection device and off-track adding device.

FIG. 3 is a diagram showing the configuration of an optical information recording and playback apparatus according to a third embodiment of the present invention.

The configuration of this embodiment will be described below with reference to FIG. 3 The configuration shown in the figure differs from the prior art optical information recording and playback apparatus by the inclusion of a focus drive amount detection device 16 and off-track adding device 12.

In FIG. 3, the focus drive amount detection device 16 performs the function of measuring the focus drive amount on the optical information recording medium, while the off-track adding device 12 performs the function of displacing the center of the light spot from the centerline of the information track on the optical information recording medium.

This embodiment concerns one embodiment of the present invention described in claims 1, 4, 5, 6, 7, 8, 9, 10, 11, 12, 13, 14, and 15 of the invention.

In this embodiment, in the optical disk recording medium playback configuration the same elements as those in the first embodiment are designated by the same reference numerals, and descriptions of such elements will not be repeated here.

In the third embodiment, a description will be given of the configuration of the means for detecting the amount of R tilt and the direction of the R tilt by using the focus drive amount detection device 16.

First, the operation for measuring the R tilt of the optical disk recording medium using the focus drive amount and playback radial position will be described.

In FIG. 3, an average focus drive value per revolution of the optical disk recording medium is detected using the focus drive amount detection device 16. In this specification, this value will be called the focus drive amount.

The detected focus drive amount varies substantially proportionally to the amount of displacement from the neutral position of the objective lens actuator 14.

Accordingly, by detecting this drive amount, the amount of surface wobbling of the optical disk recording medium can be easily determined. Further, if the amount of surface wobbling and the radial position currently being played back are known, the R tilt can be determined.

Since the optical disk recording medium has the characteristic that its R tilt is small at the inner circumferential portion and increases toward the outer circumference, the R tilt at the inner circumferential portion can be taken as the reference.

Therefore, the focus drive amount at the innermost portion is stored in the CPU 11 at start-up, and the focus drive amount is detected during playback and compared with the first stored focus drive amount; that is, the R tilt of the optical disk recording medium is calculated based on the difference between the two focus drive amounts and on the radial position currently being played back.

Further, the tilt detection method can be simplified to such an extent that only the amount of change of the focus drive amount can be detected.

The reason is that since the R tilt that increases the jitter of the optical disk recording medium is predominantly in the outer circumferential area, the amount of change at the playback radial position can be generally represented by a value obtained at or near the outermost area.

This is advantageous because it can eliminate the time required to convert the amount of change of the focus drive amount between the innermost area and the current playback area into the R tilt.

The focus drive amount detected at or near the outermost area is compared with the reference value of the focus drive amount obtained by adding an allowable focus drive amount to the focus drive amount detected at start-up at the innermost area of the optical disk recording medium where the R tilt is the smallest. If the detected focus drive amount is larger than the reference value, it is determined that the tilt amount is such a degree that requires an off-tracking operation.

The detection of the focus drive amount at or near the outermost area is performed at start-up together with the detection of the focus drive amount at the innermost area.

The configuration for performing the off-tracking operation will be described next.

As in the first embodiment, the off-tracking operation is performed using the off-tracking circuit. To determine the optimum off-track position, the off-tracking operation is repeated using one of the four measures, i.e., the jitter of the playback signal, the error rate, the C1 flag, or the RF signal, as in the first embodiment. Furthermore, as in the first embodiment, the off-track position determining means can also be simplified by setting the off-track amount as fixed values, i.e., one fixed value or more than one fixed value on each of the inner and outer circumferential sides as viewed in the direction normal to the scanning direction.

Further, in the third embodiment, the off-track direction determining means can be simplified because the direction of the R tilt is known from the polarity of the focus drive amount obtained by-the focus drive amount detection device.

It is also seen that the off-track direction that reduces the playback signal jitter is the same as the direction in which the inner circumference or the outer circumference of the optical disk recording medium is tilted toward the incidence side of the light beam, as previously shown in FIGS. 4(a) and 4(b).

The CPU 11 controls the off-track direction in accordance with the direction of the R tilt.

The off-track amount determining means here can be accomplished by a means that obtains the optimum off-track position using one of the four measures, i.e., the jitter of the playback signal, the error rate, the C1 flag, or the RF signal, as in the first embodiment, a means that varies the off-track amount according to the amount of change of the focus drive amount, a means that provides one fixed value on each of the outer and inner circumferential sides as viewed in the direction normal to the scanning direction, or a means that provides more than one fixed value on each of the outer and inner circumferential sides as viewed in the direction normal to the scanning direction.

Next, detailed setting conditions and experimental results according to the present embodiment will be described.

The optical disk recording medium used here is a single-layer DVD disk having a transparent protective layer thickness of 0.6 mm, a track pitch of 0.74 µm, and a minimum pit length of 0.40 µm. The reference value for the focus drive amount was set at a value corresponding to 0.5 deg. in terms of the R tilt, and the amount of displacement was set at ⅙ of the track pitch.

The direction of displacement was set the same as the direction in which the inner circumference or the outer circumference of the optical disk recording medium is tilted toward the incidence side of the light beam, as shown in FIGS. 4(a) and 4(b).

As a result, when a focus drive amount corresponding to an R tilt of 0.7 deg. was detected, the jitter between data clocks was improved nearly 4% by displacing the center of the light spot from the centerline of the information track.

Further, by splitting the optical disk recording medium into a number of areas in the radial direction, and making provisions to measure the amount of change of the focus drive amount each time the playback area changes from one area to the next, the time spent in the process of detecting the drive amount and performing control based on the detected drive amount can be reduced.

The playback signal used in each of the above-described embodiments can be derived from a signal recorded on the optical information recording medium by a recording operation of the optical information recording and playback apparatus, or alternatively, an address signal or other information prerecorded on the optical information recording medium can be used to derive the playback signal.

Accordingly, though the above-described embodiments have dealt mainly with an optical information recording and playback apparatus, the present invention can be equally applied to an optical information playback apparatus, in which case also the same effects as described thus far can be achieved.

Each of the above-described embodiments has been described by taking an optical disk recording medium as an example of the optical information recording medium, but the application is not limited to this specific example; for example, the invention is also applicable to other types of optical information recording media such as card type media.

In the case of such a recording apparatus, the invention can also reduce the quality degradation of the recorded signal by performing the above-described operations.

In any of the above-described embodiments, a program recording medium, such as an optical disk or a magnetic disk, may be created that holds a program for having a computer implement all or part of the functions of all or part of the means of the apparatus so that the program can be run on the computer to carry out the above-described operations. In this case also, the same effects as described above can be achieved.

As described above, according to the present invention, in an optical information recording and playback apparatus that performs recording and playback using a light beam on an optical information recording medium having a transparent protective layer, an advantageous effect can be obtained that reduces the quality degradation of the recording/playback signal caused by the tilting of the optical information recording medium relative to the light beam. The invention also offers an advantageous effect that reduces the time required to determine the optimum position to which the light spot is to be displaced.

What is claimed is:

1. An optical information recording and playback apparatus comprising:

a light source;

a focusing optical system for focusing a light beam from said light source into a microscopic light spot on a recording surface of an optical information recording medium having a transparent protective layer;

a light detector for receiving the light beam reflected or diffracted at the recording surface of said optical information recording medium, and for converting said received light beam into an electrical signal;

signal circuit for converting said electrical signal into a playback information signal;

a signal circuit for generating from said electrical signal a phase difference tracking error signal which is independent of variation in the amount of tilt in the recording medium indicating a positional displacement between an information track and the light spot on the recording surface of said optical information recording medium; and driving means of causing said light spot to follow said information track on said optical information by using said phase difference tracking error signal, said optical information recording and playback apparatus characterized by the inclusion of:

means of measuring the tilt of said optical information recording medium relative to said focusing optical system; an off-tracking circuit for displacing said light spot in a direction that reduces jitter of a playback signal obtained by playing back information recorded on said optical information recording medium from said information track, by adding an offset signal, based on a result of measuring the tilt, to said phase difference tracking error signal in order to drive the light spot to a certain direction being a direction parallel to said optical information recording medium and perpendicular to a scanning direction of said light spot, said phase difference tracking error signal being supplied to said driving means for causing said light spot to follow said information track on said optical information; and wherein said off-tracking circuit includes:

means of determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system.

2. An optical information recording and playback apparatus as set forth in claim 1, comprising a jitter detection device for detecting the jitter of the playback signal obtained by playing back information recorded on said optical information recording medium, and wherein the tilt of said optical information recording medium relative to said focusing optical system is measured by using the amount of increase in said playback signal jitter.

3. An optical information recording and playback apparatus as set forth in claim 1, wherein said means for measuring the tilt of said optical information recording medium relative to said focusing optical system is a tilt detection device comprising (1) a tilt detection light source, (2) a tilt detection focusing optical system for focusing a light beam from said tilt detection light source, and (3) a tilt detection light detector for projecting said tilt detection light beam onto said optical information recording medium, and for receiving light reflected from said optical information recording medium for conversion into an electrical signal.

4. An optical information recording and playback apparatus as set forth in claim 1, wherein said means for measuring the tilt of said optical information recording medium relative to said focusing optical system comprises a focus drive amount detection device for detecting a focus drive amount representing a drive amount in a direction perpendicular to said optical information recording medium, said focus drive amount being among said error signals supplied to said driving means, and wherein said tilt is measured based on said focus drive amount and a position currently being measured on said optical information recording medium.

5. An optical information recording and playback apparatus as set forth in claim 1, wherein said means for measuring the tilt of said optical information recording medium relative to said focusing optical system comprises a focus drive amount detection device for detecting a focus drive amount representing a drive amount in a direction perpendicular to said optical information recording medium, said focus drive amount being among said error signals supplied to said driving means, and wherein said tilt is measured based on said focus drive amount.

6. An optical information recording and playback apparatus as set forth in any one of claims 1 to 5, comprising a jitter detection device for detecting the jitter of the playback signal obtained by playing back recorded information from said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize said playback signal jitter.

7. An optical information recording and playback apparatus as set forth in any one of claims 1 to 5, comprising an error rate detection device for detecting an error rate, the rate at which the playback signal obtained by playing back recorded information from said optical information recording medium is in error when reproduced from an information signal written on said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize said error rate.

8. An optical information recording and playback apparatus as set forth in any one of claims 1 to 5, comprising flag detection device for detecting a flag that is set when there is a certain amount of error in a certain amount of information by comparing the playback signal obtained by playing back recorded information from said optical information recording medium with an information signal written on said optical information recording medium, and wherein said off-tracking circuit includes means for varying (1) an off-track direction, the direction in which said light spot is to be displaced, and (2) an off-track amount, the amount by which said light spot is to be displaced, in such a manner as to minimize the number of flags in said amount of information.

9. An optical information recording and playback apparatus as set forth in any one of claims 1 to 5, comprising an RF signal detection device for detecting the amplitude of the playback signal obtained by playing back recorded information from said optical information recording medium, and wherein said off-tracking circuit includes means for varying (1) an off-track direction, the direction in which said light spot is to be displaced, and (2) an off-track amount, the amount by which said light spot is to be displaced, in such a manner as to maximize said playback signal amplitude.

10. An optical information recording and playback apparatus as set forth in any one of claims 1 to 5, wherein said off-tracking circuit includes means for setting the off-track amount, the amount by which said light spot is to be displaced, as fixed values providing one value on the inside of said information track and one value on the outside thereof as viewed in the direction normal to the scanning direction of said light spot.

11. An optical information recording and playback apparatus as set forth in any one of claims 2 to 5, wherein said off-tracking circuit includes means for setting the off-track amount, the amount by which said light spot is to be displaced, as fixed values providing more than one value on the inside of said information track and more than one value on the outside thereof as viewed in the direction normal to the scanning direction of said light spot.

12. An optical information recording and playback apparatus as set forth in claim 1, 3, 4, or 5, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for varying an off-track amount, the amount by which said light spot is to be displaced, in accordance with the degree of the tilting of said optical information recording medium relative to said focusing optical system.

13. An optical information recording and playback apparatus as set forth in claim 1, 3, 4, or 5, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for setting an off-track amount, the amount by which said light spot is to be displaced, as fixed values providing one value on the inside of said information track and one value on the outside thereof as viewed in the direction normal to the scanning direction of said light spot.

14. An optical information recording and playback apparatus as set forth in claim 1, 3, 4, or 5, wherein said off-tracking circuit includes:

means for determining an off-track direction, the direction in which said light spot is to be displaced, as (1) a direction moving toward an inner circumference of said optical information recording medium when said inner circumference of said optical information recording medium, compared with an outer circumference thereof, is positioned closer to an incidence side of said focusing optical system because of the tilting of said optical information recording medium relative to said focusing optical system and (2) a direction moving toward said outer circumference of said optical information recording medium when said outer circumference, compared with said inner circumference, is positioned closer to the incidence side of said focusing optical system because of the tilting of said optical information recording medium relative to said focusing optical system; and means for setting an off-track amount, the amount by which said light spot is to be displaced, as fixed values providing more than one value on the inside of said information track and more than one value on the outside thereof as viewed in the direction normal to the scanning direction of said light spot.

15. An optical information recording and playback apparatus as set forth in any one of claims 1 to 5, comprising means for splitting said optical information recording medium into a prescribed number of areas according to the amount of warping contained in said optical information recording medium, and for measuring the tilt of said optical information recording medium relative to said focusing optical system each time switching is made from one area to another.

16. The optical information recording and playback apparatus of claim 1 wherein the offset signal has a predetermined fixed value that is added to the error signal to displace the light spot by approximately 0.1 microns.

17. In an optical information recording and playback system, a method for moving a light beam on a recording surface having an information track, comprising the steps of:

a) focusing the light beam at a first spot on the recording surface;

b) converting a reflected light beam from the first spot into an electrical signal;

c) generating a phase difference tracking error signal from the electrical signal indicating a positional displacement between the information track and the first spot wherein the phase difference tracking error signal is independent of variation in the amount of tilt in the recording surface;

d) measuring an amount of jitter in the electrical signal, wherein a tilt between the recording surface and the reflected light beam is indicated by the amount of jitter;

e) adding an offset signal to the phase difference tracking error signal based on a result of measuring the tilt; and f) moving the light beam to the information track on the recording surface using the offset signal, and the phase difference tracking error signal, the light beam moves to the information track independently of the variation in the amount of tilt in the recording surface.

18. The method of claim 17 wherein the offset signal is added to the error signal when the amount of jitter exceeds a predetermined value.

19. The method of claim 18 wherein moving the light beam to the second spot includes (i) moving the light beam a predetermined distance in response to the offset signal, and (ii) moving the light beam in response to the error signal, wherein the combined movement distance moves the light beam to the second spot on the recording surface.

20. The method of claim 19 wherein moving the light beam a predetermined distance includes moving the light beams in either one of two directions depending on an orientation of the tilt between the recording surface and the reflected light beam.

21. The method of claim 16 wherein step (e) includes adding the offset signal as a predetermined fixed value to the error signal, if the amount of jitter exceeds a threshold value, and step (f) includes moving the light beam by approximately 0.1 microns to the information track using the predetermined fixed value.

22. An optical information recording and playback apparatus comprising:

a light source;

a focusing optical system for focusing a light beam from said light source into a microscopic light spot on a recording surface of an optical information recording medium having a transparent protective layer;

a light detector for receiving the light beam reflected or diffracted at the recording surface of said optical information recording medium, and for converting said received light beam into an electrical signal;

a signal circuit for converting said electrical signal into a playback information signal;

a signal circuit for generating from said electrical signal a phase difference tracking error signal indicating a positional displacement between an information track and the light spot on the recording surface of said optical information recording medium wherein the phase difference tracking error signal is independent of variation in the amount of tilt in the recording medium; and driving means of causing said light spot to follow said information track on said optical information recording medium by using said phase difference tracking error signal, said optical information recording and playback apparatus characterized by the inclusion of:

means of measuring the tilt of said optical information recording medium relative to said focusing optical system; and an off-tracking circuit for displacing said light spot in a direction that reduces jitter of a playback signal obtained by playing back information recorded on said optical information recording medium from said information track, by adding a predetermined fixed offset signal to said phase difference tracking error signal in order to drive the light spot in a direction; and parallel to said optical information recording medium and perpendicular to a scanning direction of said light spot, said predetermined fixed offset signal supplied to said driving means for causing said light spot to follow said information track on said optical information recording medium, wherein when the offset signal is added to the phase difference tracking error signal, the light beam moves to the information track independently of the variation in the amount of tilt in the recording surface.

23. In an optical information recording and playback system, a method for moving a light beam on a recording surface having an information track, comprising the steps of:

a) focusing the light beam at a first spot on the recording surface;

b) converting a reflected light beam from the first spot into an electrical signal;

c) generating a phase difference tracking error signal from the electrical signal indicating a positional displacement between the information track and the first spot wherein the phase difference tracking error signal is independent of variation in the amount of tilt in the recording surface;

d) measuring an amount of jitter in the electrical signal, wherein a tilt between the recording surface and the reflected light beam is indicated by the amount of jitter;

e) adding a predetermined fixed offset signal to the phase difference tracking error signal, if the amount of jitter in step (d) exceeds a threshold value; and f) moving the light beam to the information track on the recording surface using the added predetermined fixed offset signal and the phase difference tracking error signal, the light beam moves to the information track independently of the variation in the amount of tilt in the recording surface.

* * * * *